United States Patent [19]
Weigel

[11] Patent Number: 5,915,057
[45] Date of Patent: Jun. 22, 1999

[54] CONNECTOR FOR A FIBER OPTIC CABLE

[75] Inventor: Hans-Dieter Weigel, Berlin, Germany

[73] Assignee: Siemens Aktiengesellschaft, Munich, Germany

[21] Appl. No.: 09/032,700

[22] Filed: Mar. 2, 1998

Related U.S. Application Data

[63] Continuation of application No. PCT/DE96/01658, Aug. 30, 1996.

[51] Int. Cl.$^6$ ...................................................... G02B 6/36
[52] U.S. Cl. .................................. 385/76; 385/78; 385/86
[58] Field of Search ................................ 385/76, 78, 81, 385/86, 60, 72

[56] References Cited

U.S. PATENT DOCUMENTS

| | | | |
|---|---|---|---|
| 4,687,288 | 8/1987 | Margolin et al. | 385/84 |
| 4,712,860 | 12/1987 | Corrales | 385/78 |
| 5,293,582 | 3/1994 | Beard et al. | 385/60 |
| 5,311,609 | 5/1994 | Abe | 385/78 |
| 5,428,703 | 6/1995 | Lee | 385/78 |
| 5,611,012 | 3/1997 | Kluchenbecker | 385/86 |

FOREIGN PATENT DOCUMENTS

| | | |
|---|---|---|
| 0297439A2 | 1/1989 | European Pat. Off. . |
| 0330399A1 | 8/1989 | European Pat. Off. . |
| 0597501A1 | 5/1994 | European Pat. Off. . |
| 2811404 | 9/1978 | Germany . |

*Primary Examiner*—Hemang Sanghavi
*Attorney, Agent, or Firm*—Herbert L. Lerner; Laurence A. Greenberg

[57] ABSTRACT

The connector includes a plug pin, a forward housing part relative to the plug-in direction, and a rear housing part. The plug pin is axially displaceable in the forward housing part against the force of a helical spring. The forward housing part has internal retainers which secure the helical spring against slipping out backwardly before the two housing parts are connected to one another.

4 Claims, 2 Drawing Sheets

CONNECTOR FOR A FIBER OPTIC CABLE

CROSS-REFERENCE TO RELATED APPLICATION

This application is a continuation of copending international application Serial No. PCT/DE96/01658, filed Aug. 30, 1996, which designated the United States.

Background of the Invention

1. Field of the Invention

The invention relates to a connector for a fiber optic cable, with a plug pin which encloses one end of an optical fiber, with a helical spring which is concentric with the plug-in axis and is pushed onto the rear end of the plug pin or of a plug pin support, having a housing part which is at the front in the plug-in direction and has an axial through opening in which the plug pin can be displaced axially against the force of the helical spring, and having a rear housing part, which is connectible to the forward housing part.

2. Description of the Related Art

Such a prior art connector, as it is known from European patent disclosure EP-0 330 399 A1, forms a coupling end piece for connecting a fiber optic cable which comprises a cable sheath, stress relieving means (for example aramid fibers) and an optical fiber surrounded by a protective cladding, to, for example, a further cable or an optoelectronic component. The stripped optical fiber end at the coupling end extends in a central longitudinal bore of a plug pin. The rear end of the plug pin in the plug-in direction is held by a pin support, onto whose rear extension one end of a helical spring concentric with the longitudinal axis of the plug pin is pushed, and which can be displaced axially, against the spring force, with the plug pin in a central bore of a first or forward housing part. The other end of the helical spring is supported on a rear housing part, which is connectible to the forward housing part by fixing the helical spring and which is formed with a central bore in which the optical fiber extends toward the cable. In order to keep axial tensile stresses away from the optical fiber, the end of the stress relief element is fixed by crimping between a rear extension of the rear housing part and a separate sleeve.

In the prior art connector it is necessary for the stripped optical fiber to be first threaded through the through openings of the housing parts, to be inserted into the longitudinal bore of the plug pin, and to be bonded therein. The forward housing part is then connected to the rear housing part; this is preferably done immediately following the above-named production steps, in order to protect the sensitive plug pin arrangement, which initially projects from the rear housing part at the front without protection. Prefabrication, desirable with regard to variations in the configuration of the plug pin region, in conjunction with simultaneous protection of the prefabricated plug pin arrangement by a subassembly belonging to the connector is not possible in the case of the prior art connector.

SUMMARY OF THE INVENTION

It is accordingly an object of the invention to provide a plug connector for a fiber optic cable, which overcomes the above-mentioned disadvantages of the prior art devices and methods of this general type and which results in a connector with a protected connector configuration that can be prefabricated.

With the foregoing and other objects in view there is provided, in accordance with the invention, a connector for a fiber optic cable, comprising:

a plug pin assembly defining a plug-in axis and enclosing an end of an optical fiber, the plug pin assembly having a forward end relative to a plug-in direction and a rear end;

a helical spring concentrically disposed about the plug-in axis on the rear end of the plug pin assembly;

a forward housing part formed with an axial through opening wherein the plug pin is axially displaceable axially against a force of the helical spring, and a rear housing part connectible to the forward housing part; the forward housing part being formed with internal retainers inside the through opening, the retainers, when the forward housing part is not connected to the rear housing part, holding the helical spring and securing the spring and the plug pin assembly against slipping out backwards from the forward housing part.

In accordance with an added feature of the invention, the plug pin assembly includes a plug pin and a plug pin support holding the plug pin.

In other words, the object of the invention is satisfied with the holding elements on the forward housing part inside the opening. The holding elements hold the helical spring when the forward housing part has not yet been connected with the rear housing part. The plug pin, i.e. the pin and/or the plug pin support, is thereby secured against slipping out backward from the forward housing part. A substantial advantage of the invention consists in that the plug pin and, if appropriate, a pin support holding the rear end of the plug pin, and the helical spring pushed backward onto the pin or the bearing form, together with the forward housing part, a prefabricated assembly which is easy to handle during production. As a result, it is possible, for example, for different plug pins to be prefabricated with helical springs and the forward housing part and, if required, for them to be connected in a concluding production step to a component which can likewise be prefabricated and comprises the rear housing part and the fiber optic cable end. A further advantage consists in that—before the housing parts are connected—the rear end of the plug pin or of the pin support is still easily accessible for the application of an adhesive. Subsequently, the stripped optical fiber end can immediately be inserted into the central bore of the plug pin.

In accordance with an additional feature of the invention, the retainers are two or more backwardly projecting, resilient latching arms extending substantially parallel to the plug-in axis, the latching arms being formed with latching elements positively engaging the helical spring. The latching arms can preferably be integrally extruded directly onto the forward housing part. Because of their spring characteristic, the latching arms hold the helical spring in the desired position and yet permit axial compression of the helical spring.

In accordance with a concomitant feature of the invention, the latching elements are formed with internal profiles facing towards the helical spring, the internal profiles having a contour matched to a contour of turns of the helical spring.

Other features which are considered as characteristic for the invention are set forth in the appended claims.

Although the invention is illustrated and described herein as embodied in a connector for a fiber optic cable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing figures.

DESCRIPTION OF THE PREFERRED EMBODIMENT

Figure 1:
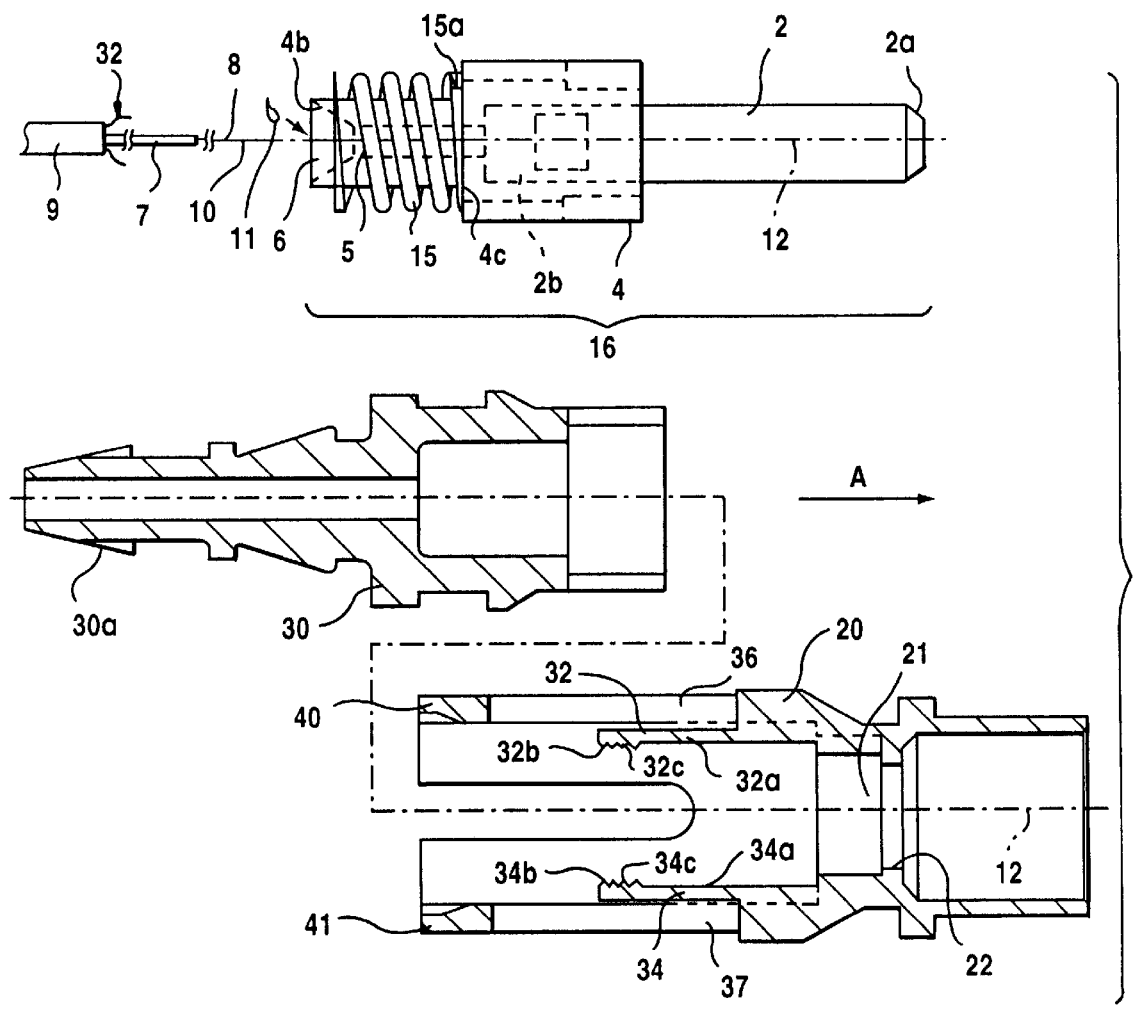
FIG. 1 is a partly diagrammatic, elevational and partly longitudinal sectional view of the essential components of the connector according to the invention, in a separated condition.

Referring now to the figures of the drawing in detail, the connector 1 comprises a plug pin 2 with an end 2a on the coupling side and an end 2b at the rear (relative to a plug-in direction A). The end 2b is held by a pin bearing or pin support 4 which is an injection molded part formed with through bore 5. The bore 5 extends toward the end 2b and has an insertion opening 6 for accepting an optical fiber 8 (diagrammatically indicated only in FIG. 1) of a fiber optic cable 9. The end of the optical fiber 8 has been stripped of its protective cladding 7. The end 10 of the optical fiber 8 is inserted into a central bore (not shown here in more detail for purposes of brevity and so as not to unnecessarily clog the illustration) of the plug pin 2 and fixed in the insertion opening 6 by pre-insertion application of an adhesive 11. A helical spring 15 concentric with the longitudinal axis (plug-in axis) 12 of the plug pin 2 and which is supported with one end 15a on a shoulder 4c is pushed axially onto the rear end 4b of the pin support 4. The module formed by the plug pin 2, the bearing 4 and the spring 15 will also be referred to herein as a plug module 16.

The connector 1 further comprises a forward housing part 20 (at the front relative to the plug-in direction A) formed with an axial through opening 21 for holding the optical fiber 8, i.e., the plug module 16. A stop 22 projecting into the through opening 21 limits the freedom of movement of the pin support 4 and of the plug pin 2 in the plug-in direction A. A rear housing part 30 is formed with a conical and profiled rear portion 30a. The rear portion 30a serves to fix anti-pull latches 40, 41 which can be pushed onto the conical and profiled segment, bonded if required, and surrounded by a non-illustrated antikink sleeve.

Figure 2:
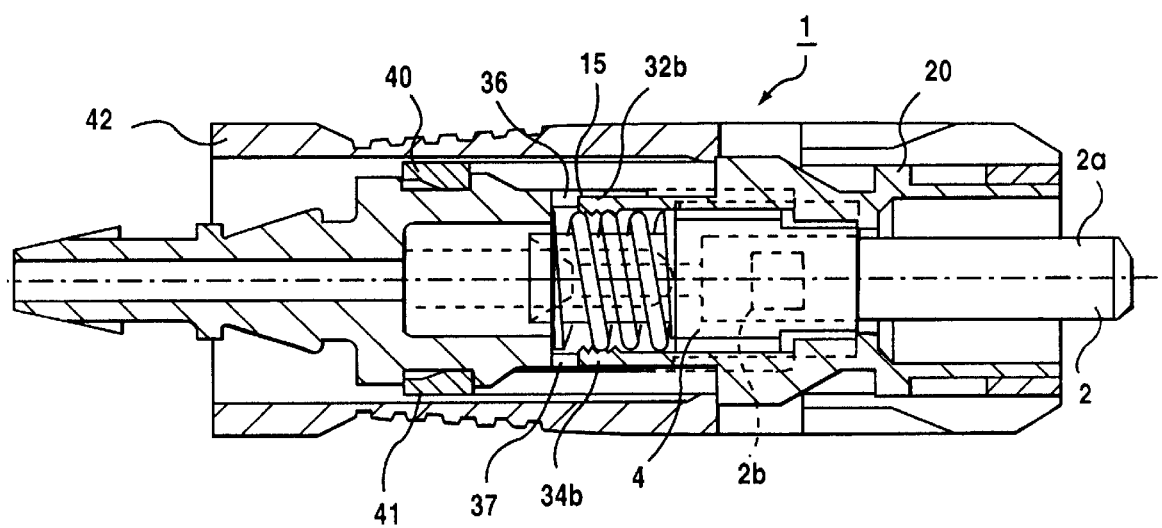
FIG. 2 is a longitudinal sectional view of the fiber optic cable connector of FIG. 1 in an assembled condition.

The forward housing part 20 has internal retainers 32, 34, which are integrally formed in unitary construction with the housing part 20. The retainers 32, 34 secure the helical spring 15 before the connection of the housing parts 20, 30 against slipping out backward (against the plug-in direction A) from the forward housing part 20. The retainers are resilient latching arms 32a, 34a extending backward into the opening 21 parallel to the plug-in axis 12. Latching elements 32b, 34b formed on their free ends engage the helical spring 15 (FIG. 2). The latching elements 32b, 34b are provided on the inside with profiles 32c, 34c which face the turns of the helical spring 15 and are matched to the contour of the latter. The latching arms 32, 34 spring back radially outwards in longitudinal slots 36, 37 inside the housing part 20, and therefore have a particularly favorable spring characteristic.

It is possible by means of the inventive configuration of the connector for the plug pin, the pin support and the helical spring to be prefabricated, together with the forward housing part, completely independently of the remaining components of the plug. After the helical spring 15 has been pushed onto he rear end 4b of the pin support 4 and the plug module 16 has been brought into the forward housing part 20, the resilient latching arms 32, 34 engage and mesh with their profiles 32c, 34c in the helical turns and thereby hold the helical spring 15 and the entire plug module 16 in the preliminary position desired for further assembly. Entirely independently of this module, the rear housing part and an appropriately prefabricated fiber optic cable can be prepared and connected to the forward housing part in a concluding production operation. In this case, the rear region 4b of the pin support 4 with the insertion opening 6 is also accessible after the prefabrication, in a particularly advantageous way, with the result that the adhesive 11 can be applied easily. During the subsequent insertion, the optical fiber end 10 is wetted by the adhesive 11. After the optical fiber end 10 has been completely inserted into the plug pin 2, the rear housing part 30 is also pushed on and latched with the housing part 20 by means of anti-pull latching fingers 40, 41. The stress-relieving means 32 are fixed between the extension 30a and the non-illustrated antikink sleeve. After assembly, the connector 1 can, if necessary, be pushed as a whole into an outer sheath housing 42 (FIG. 2) and latched therein. The housing 42 completes the assembly to form a conventional push-pull plug.

I claim:

1. A connector for a fiber optic cable, comprising:
    a plug pin assembly defining a plug-in axis and enclosing an end of an optical fiber, said plug pin assembly having a forward end relative to a plug-in direction and a rear end;
    a helical spring concentrically disposed about said plug-in axis on said rear end of said plug pin assembly;
    a forward housing part formed with an axial through opening wherein said plug pin is axially displaceable against a force of said helical spring, and a rear housing part connectible to said forward housing part;
    said forward housing part being formed with internal retainers inside said through opening, said retainers, when said forward housing part is not connected to said rear housing part, holding said helical spring and securing said spring and said plug pin assembly against slipping out backwards from said forward housing part.

2. The connector according to claim 1, wherein said plug pin assembly includes a plug pin and a plug pin support holding said plug pin.

3. The connector according to claim 1, wherein said retainers are at least two backwardly projecting, resilient latching arms extending substantially parallel to said plug-in axis, said latching arms being formed with latching elements positively engaging said helical spring.

4. The connector according to claim 2, wherein said internal retainers are formed with internal profiles facing towards said helical spring, said internal profiles having a contour matched to a contour of turns of said helical spring.

* * * * *

UNITED STATES PATENT AND TRADEMARK OFFICE
CERTIFICATE OF CORRECTION

PATENT NO : 5,915,057
DATED : June 22, 1999
INVENTOR(S) : Hans-Dieter Weigel

It is certified that error appears in the above-identified patent and that said Letters Patent is hereby corrected as shown below:

On the title page:

Item [30] should read as follows:

Sep. 1, 1995      [DE]    Germany .......... 195 33 498.1

Signed and Sealed this

Ninth Day of November, 1999

*Attest:*

Q. TODD DICKINSON

*Attesting Officer*      *Acting Commissioner of Patents and Trademarks*